(12) United States Patent
Bagni et al.

(10) Patent No.: US 8,882,471 B2
(45) Date of Patent: Nov. 11, 2014

(54) METHOD AND DEVICE FOR CONTROLLING A HOT RESTART OF A CENTRIFUGAL COMPRESSOR

(75) Inventors: Gianni Bagni, Florence (IT); Michele Fontana, Florence (IT); Antonio Baldassarre, Florence (IT); Leonardo Baldassarre, Florence (IT)

(73) Assignee: Nuovo Pignone S.p.A., Florence (IT)

( * ) Notice: Subject to any disclaimer, the term of this patent is extended or adjusted under 35 U.S.C. 154(b) by 508 days.

(21) Appl. No.: 13/175,086

(22) Filed: Jul. 1, 2011

(65) Prior Publication Data

US 2012/0027623 A1 Feb. 2, 2012

(30) Foreign Application Priority Data

Jul. 30, 2010 (IT) .............................. CO2010A0042

(51) Int. Cl.
| | | |
|---|---|---|
| *F04B 49/06* | (2006.01) | |
| *F01D 19/00* | (2006.01) | |
| *F04D 27/00* | (2006.01) | |
| *F02C 3/10* | (2006.01) | |
| *F04D 27/02* | (2006.01) | |
| *F02C 3/107* | (2006.01) | |

(52) U.S. Cl.
CPC .............. *F04D 27/001* (2013.01); *F01D 19/00* (2013.01); *F02C 3/10* (2013.01); *F05D 2270/02* (2013.01); *F04D 27/0261* (2013.01); *F05D 2260/96* (2013.01); *F02C 3/107* (2013.01)
USPC ........... 417/53; 417/293; 62/228.1; 62/228.4; 62/228.5

(58) Field of Classification Search
CPC ............ F02C 3/10; F02C 3/107; F01D 19/00; F04D 27/0261; F05D 2260/96
USPC ........... 417/53, 293; 60/239; 62/228.1, 228.5, 62/231
See application file for complete search history.

(56) References Cited

U.S. PATENT DOCUMENTS

| 4,476,674 A | 10/1984 | Berman |
| 6,463,740 B1 | 10/2002 | Schmidt et al. |
| 7,025,559 B2 | 4/2006 | Loy et al. |
| 7,421,854 B2 | 9/2008 | Shaffer et al. |
| 2005/0160750 A1 | 7/2005 | Shaffer et al. |
| 2009/0037121 A1 | 2/2009 | Muralidharan et al. |

FOREIGN PATENT DOCUMENTS

EP 1607583 A1 12/2005

OTHER PUBLICATIONS

IT Search Report issued in priority IT Application CO2010A000042 Date of Search Report Mar. 15, 2011 (8 Pages).

*Primary Examiner* — Peter J Bertheaud
*Assistant Examiner* — Dominick L Plakkoottam
(74) *Attorney, Agent, or Firm* — GE Global Patent Operation

(57) ABSTRACT

Methods, devices and systems capable of performing a hot restart of a compressor driven by a turbine are provided. The turbine has a high speed shaft and a low speed shaft connected to the compressor. A base slow roll speed at which a speed of the low speed shaft is in a slow roll range is maintained at the high speed shaft for a predetermined time. Then, when a vibration amplitude of the compressor is larger than a vibration limit, the maintaining is repeated. Otherwise, a set speed of the high speed shaft is increased, until a current speed of the low speed shaft reaches a minimum operating speed. If, while increasing the set speed, the vibration amplitude becomes larger than the vibration limit, the maintaining is repeated.

5 Claims, 6 Drawing Sheets

METHOD AND DEVICE FOR CONTROLLING A HOT RESTART OF A CENTRIFUGAL COMPRESSOR

BACKGROUND OF THE INVENTION

1. Field of the Invention

Embodiments of the subject matter disclosed herein generally relate to methods and devices used to control a hot restart of a centrifugal compressor driven by a low speed shaft of a gas turbine.

2. Description of the Prior Art

In natural gas processing systems, often a gas turbine 10 drives a centrifugal compressor 20. When a sudden shutdown occurs, a shaft (or rotor) of the centrifugal compressor 20 usually develops a thermal bow due to an asymmetric cooling (e.g., an upper side and a lower side of the centrifugal compressor 20 have different rates of cooling). If the cooling process is allowed to be completed, eventually, the thermal bow disappears. However, often it is necessary to restart the centrifugal compressor 20 sooner then the end of the cooling, while the thermal bow is still present. The restarting of the compressor 20 before the cooling is completed is named a hot restart.

When the centrifugal compressor 20 is restarted while the thermal bow is still present, vibrations may occur. The vibrations usually have a maximum amplitude at a speed lower than operational speeds. Strong vibrations may result in rubbing and permanent damage to the compressor 20.

A method of suppressing the thermal bow without waiting for complete cooling (which may last from several hours to several tens of hours depending on the compressor size and geometry) is to run the compressor 20 for a while at a low speed. This method is known as the slow roll method.

Conventionally, the slow roll method is implemented by inserting a turning gear 60 that may be attached to the compressor 20 (as shown in FIG. 1) or to a gearbox 30, if present. The turning gear 60 is used to rotate the shaft 50 of the compressor 20 at a low speed until the bow is suppressed.

However, adding a turning gear increases the cost of the system. Sometimes, a turning gear cannot be added to a system due to structural constraints. Additionally, the turning gear may fail, and, therefore, unintentionally, the compressor may be damaged by running at damaging speeds while still having a bow.

Accordingly, it would be desirable to provide systems and methods that avoid the afore-described problems and drawbacks.

BRIEF SUMMARY OF THE INVENTION

According to one exemplary embodiment, a system includes a compressor, a turbine and a controller. The turbine has a high speed shaft and a low speed shaft, the low speed shaft being configured to drive the compressor. The controller is connected to the compressor and the turbine. The controller is configured to perform, while the vibration amplitude remains smaller than a vibration limit, maintaining, for a predetermined time, the speed of the high speed shaft at a value at which the current speed of the low speed shaft is in a slow roll speed range, and, then, increasing the speed of the high speed shaft until the current speed of the low speed shaft exceeds a minimum operating speed.

According to one exemplary embodiment, a method for controlling a hot restart of a compressor driven by a turbine having a high speed shaft and a low speed shaft, which is connected to the compressor, is provided. The method includes maintaining, for a predetermined time, a base speed of the high speed shaft at which a current speed of the low speed shaft is in a slow roll range. The method further includes comparing a vibration amplitude of vibrations of the compressor with a vibration limit, and, when the vibration amplitude is larger than the vibration limit, repeat the maintaining. The method also includes increasing a set speed of the high speed shaft until the current speed of the low speed shaft exceeds a minimum operating speed, while the vibration amplitude remains smaller than the vibration limit. When the amplitude of vibrations becomes larger than the vibration limit during the increasing, the maintaining is repeated.

According to another exemplary embodiment, a controller configured to control a hot restart of a compressor driven by a turbine, which has a high speed shaft and a low speed shaft that is connected to the compressor is provided. The controller includes an interface and a processing unit. The interface is configured to receive information about a current speed of the low speed shaft and a vibration amplitude of vibrations of the compressor, and to transmit commands related to setting a speed of the high speed shaft. The processing unit is connected to the interface and is configured to generate the commands based on the information. The commands include a first sequence of commands to maintain, for a predetermined time, a base slow roll speed of the high speed shaft, and a second sequence of commands to increase a set speed of the high speed shaft until the current speed of the low speed shaft exceeds a minimum operating speed. A speed of the low speed shaft is within a slow roll range, when the high speed shaft has the base slow roll speed. The processing unit is configured to repeat sending the first sequence of commands to the interface, when, according to the information, the vibration amplitude is larger than a vibration limit.

BRIEF DESCRIPTION OF THE SEVERAL VIEWS OF THE DRAWINGS

The accompanying drawings, which are incorporated in and constitute a part of the specification, illustrate one or more embodiments and, together with the description, explain these embodiments. In the drawings.

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a gas processing system in which a gas turbine drives a centrifugal compressor. However, the embodiments to be discussed next are not limited to these systems, but may be applied to other systems in which an axial compressor or other turbine are used.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
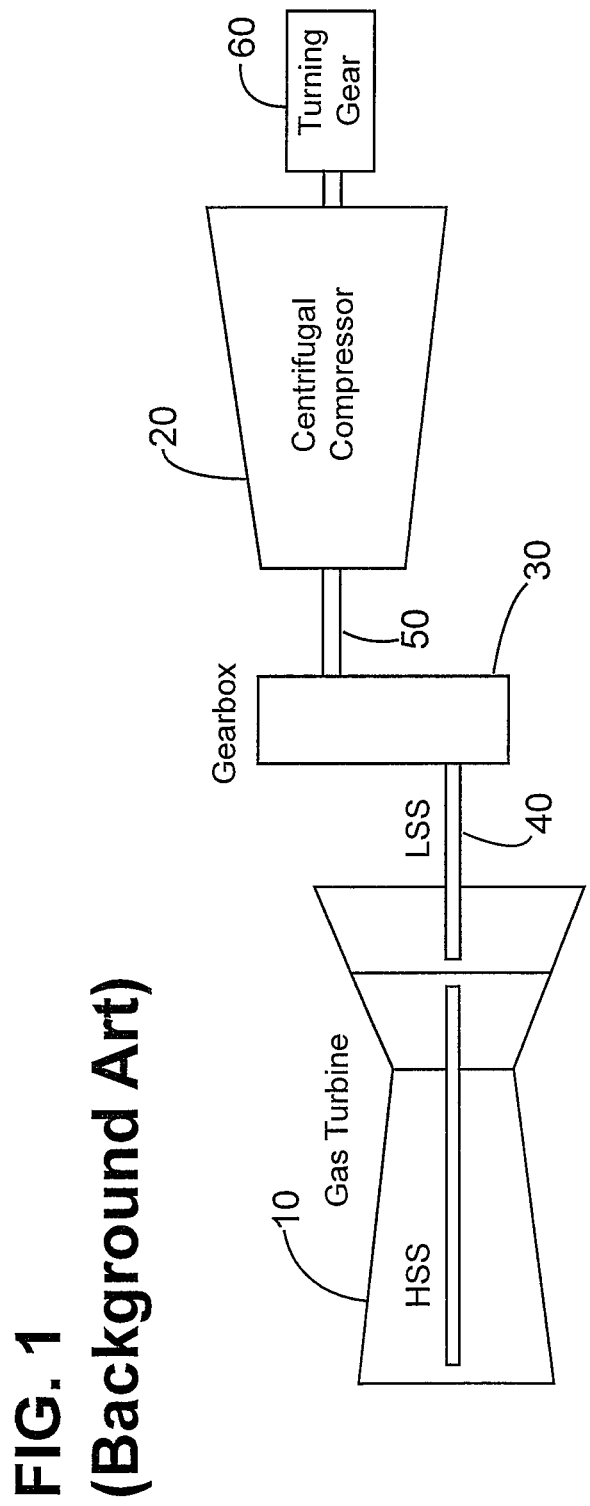
FIG. 1 is a schematic diagram of a conventional gas processing system.
Figure 2:
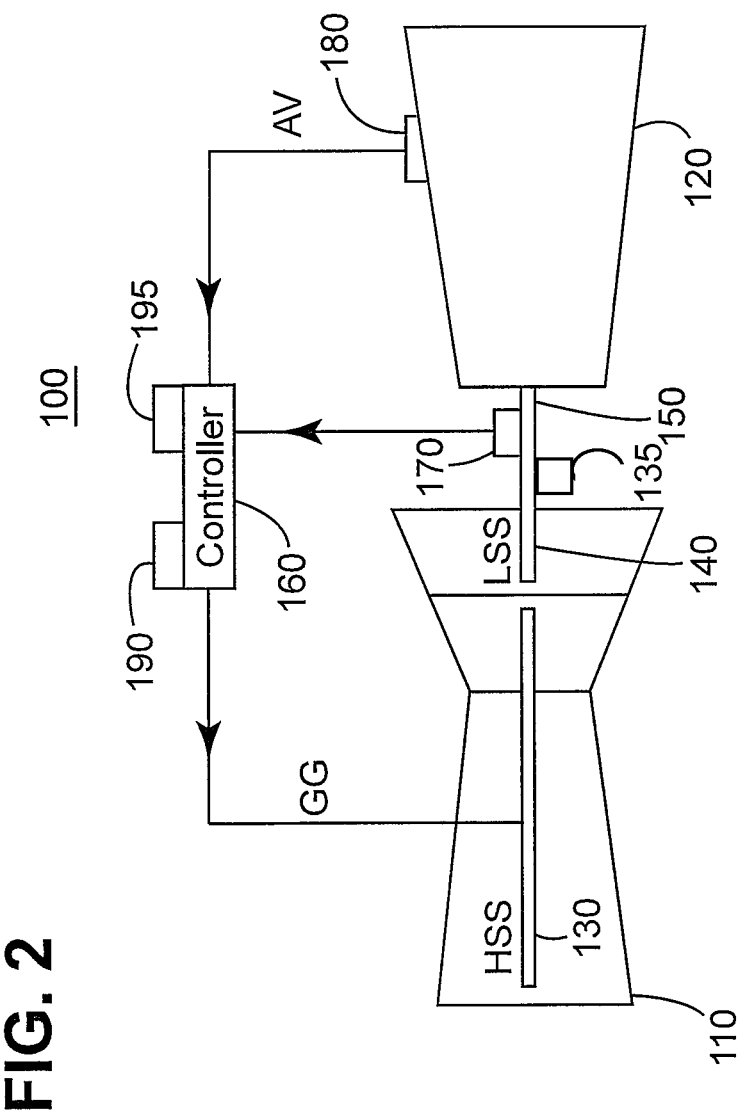
FIG. 2 is a schematic representation of a gas processing system according to an embodiment.

FIG. 2 is a schematic representation of a gas processing system 100 according to an embodiment. The gas processing system 100 includes a gas turbine 110 which drives a centrifugal compressor 120. The gas turbine 110 has a high speed shaft 130 and a low speed shaft 140. The low speed shaft 140 is connected to a shaft 150 of the centrifugal compressor 120. A gearbox 135 may be present between the gas turbine low speed shaft 140 and the compressor 120. The low speed shaft 140 may have the same speed as the shaft 150 of the centrifugal compressor 120, depending on whether the gearbox is present.

The speed of the high speed shaft 130 is controlled by a controller 160. The speed of the low speed shaft 140 is related to the speed of the high speed shaft 130. When the speed of the high speed shaft 130 increases, the speed of the low speed shaft 140 also increases. However, the relationship between the speed of the high speed shaft 130 and the speed of the low speed shaft 140 is a complex relationship, which depends, among other factors, on a load due to the centrifugal compressor 120.

The controller 160, which sets the speed (HSSS) of the high speed shaft 130, may receive information on a current speed (LSSS) of the low shaft speed 140, for example, from a sensor 170. The controller 160 may also receive information about a vibration amplitude (VA) characterizing vibrations in the compressor 120, for example, from a vibration sensor 180.

During a hot restart of the centrifugal compressor 120, the controller 160 may set the speed of the high speed shaft 130 in a speed range between a first speed value (SV1) and a second speed value (SV2). For example, the first speed value may be about 6000 rpm and the second speed value may be about 7100 rpm.

The speed of the low speed shaft during the slow roll is preferably in a slow roll speed range between a low slow roll speed value (LLL) and a high slow roll speed value (HHH). For example, LLL may be about 2000 rpm, and HHH, may be about 3000 rpm. Thos skilled in the art will understand that these value may change depending on the size of the system 100. The slow roll speed range includes speed values below a speed value at which the centrifugal compressor has maximum vibrations. For example, if the speed value at which the centrifugal compressor has maximum vibrations is 30-40% of a maximum operating speed, the slow roll speed range is between 20-30% of the maximum operating speed.

Once the speed of the high speed shaft 130 is set, the controller 160 may receive information about the current speed of the low speed shaft 140. The controller may adjust the speed of the high speed shaft 130 until the current speed of the low speed shaft 140 is within the range (i.e., larger than the low slow roll speed value LLL and smaller than the high slow roll speed value HHH).

The controller 160 may include a slow roll counter 190. The controller 160 may also include a timer 195. However, a slow roll counter and a timer may be separate components of the gas processing system, in communication with the controller 160.

Figure 3:
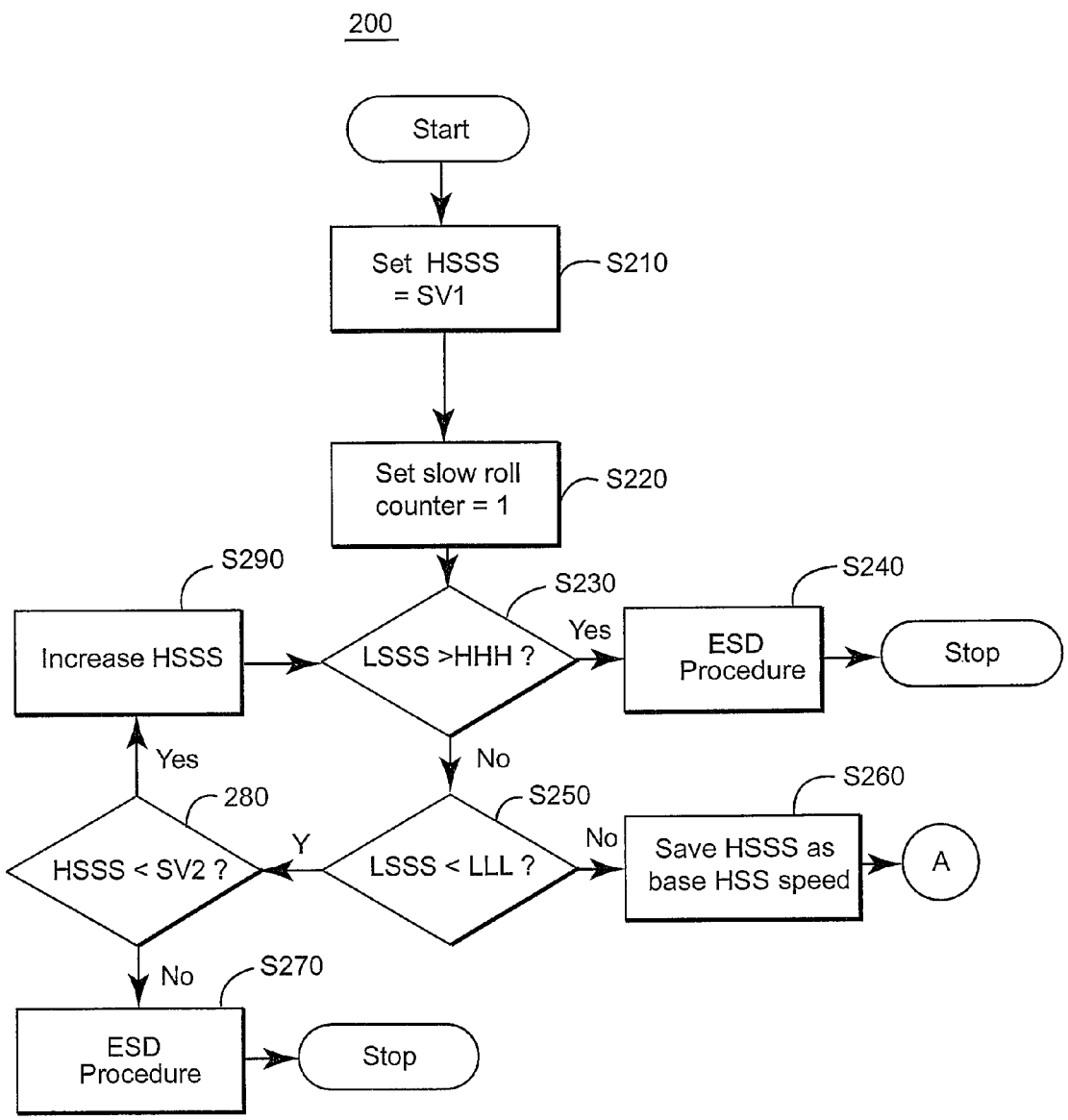
FIGS. 3, 4 and 5 represent a flow diagram of a method for controlling a hot restart of a centrifugal compressor, according to an embodiment.
Figure 4:
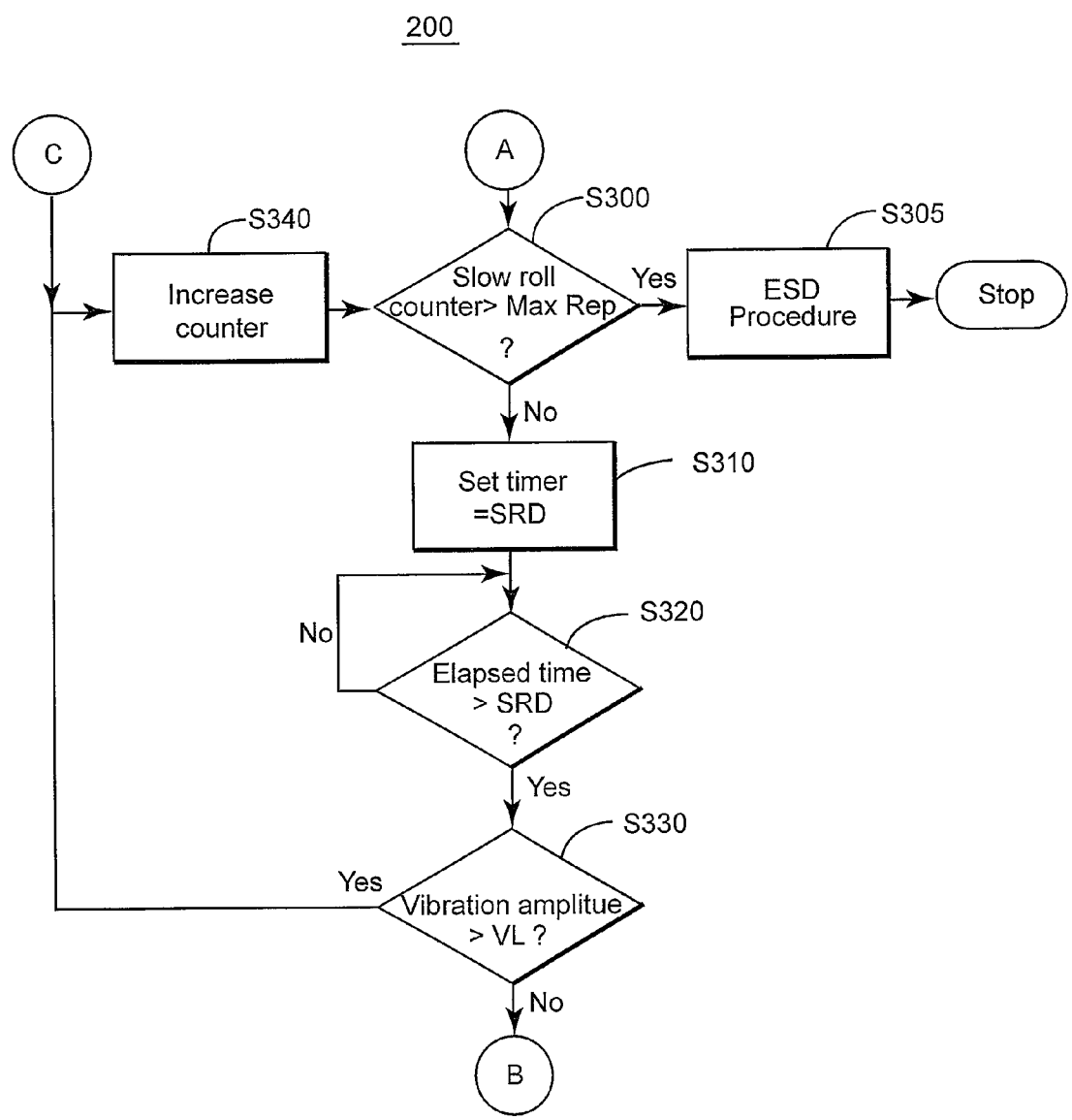
Figure 5:
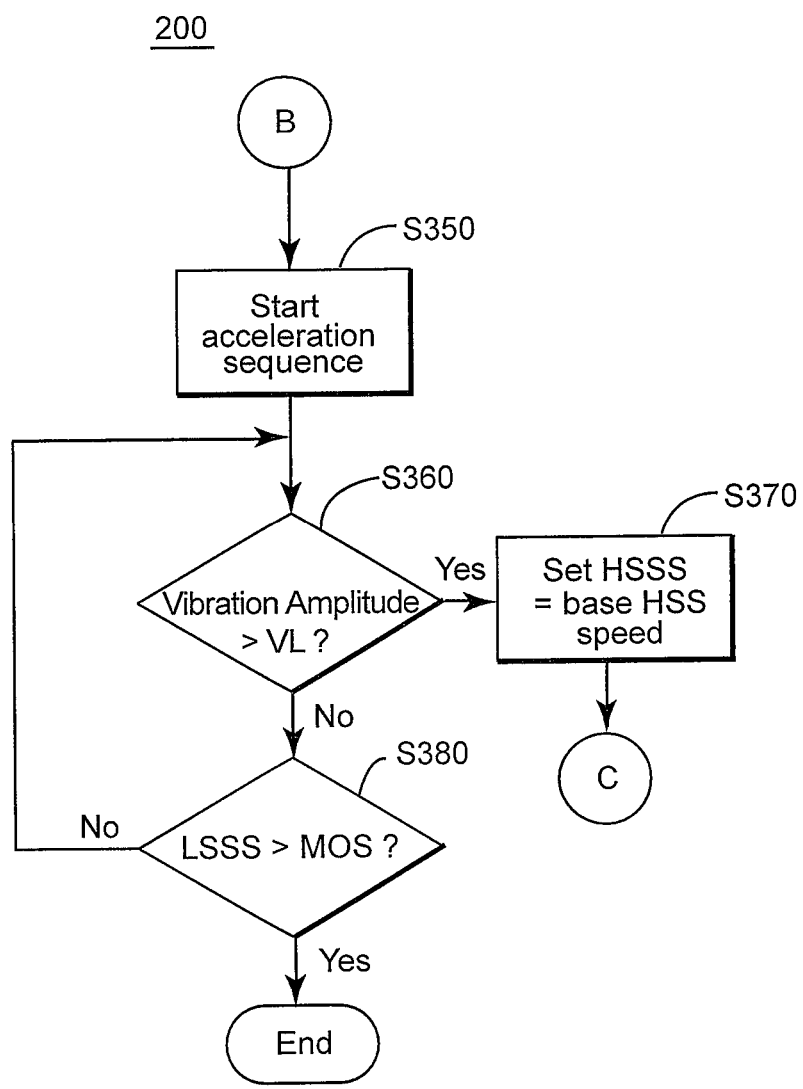

FIGS. 3, 4 and 5 represent a flow diagram of a method 200 for controlling a hot restart of a centrifugal compressor (e.g., 120 in FIG. 2) according to an embodiment. The method may be performed in the gas processing system 100 illustrated in FIG. 2.

In FIG. 3, at S210, a speed (HSSS) of a high speed shaft (e.g., 130 in FIG. 2) is set at the first speed value (SV1). A slow roll counter (e.g., 190 in FIG. 2) is set to 1, at S220. A current value of the speed (LSSS) of the low speed shaft (e.g., 140 in FIG. 2) is compared with the high slow roll speed value (HHH), at S230.

If, the comparison at S230 indicates that the current value of the speed (LSSS) of the low speed shaft is larger than the high slow roll speed value (HHH) (i.e., the YES branch from S230), an emergency shutdown procedure is performed at S240 to stop operation of the system including the compressor.

If the comparison at S230 indicates that the current value of the speed (LSSS) of the low speed shaft is smaller than the high slow roll speed value (HHH) (i.e., the NO branch from S230), the current value of the speed (LSSS) of the low speed shaft is compared with the low slow roll speed value (LLL), at S250.

If the comparison at S250 indicates that the current value of the speed (LSSS) of the low speed shaft is larger than the low slow roll speed value (LLL) (i.e., the NO branch from S250), the speed (HSSS) of the high speed shaft is saved as a base HSS speed, at S260. Step 300 illustrated in FIG. 4 follows step S260.

If the comparison at S250 indicates that the current value of the speed (LSSS) of the low speed shaft is smaller than the low slow roll speed value (LLL) (i.e., the YES branch from S250), the speed (HSSS) of the high speed shaft is compared with the second speed value (SV2), at S280.

If the comparison at S280 indicates that the speed (HSSS) of the high speed shaft is larger than the second speed value (SV2) (i.e., the NO branch from S280), an emergency shutdown procedure is performed at S270.

If the comparison at S280 indicates that the speed (HSSS) of the high speed shaft is smaller than the second speed value (SV2) (i.e., the YES branch from S280), the speed (HSSS) of the high speed shaft is increased at S290. A rate of increasing the speed (HSSS) of the high speed shaft may be limited to a predetermined value, for example, 10 rpm/s. After the step S290, step S230 and respective steps following S230 are performed again. The HSS speed is continuously increased, and the comparisons at S230, S250 and S280 are also continuously performed. Increasing HSSS ends if the comparisons performed at S230 or S280 result in triggering the ESD procedure, or if the comparison at S250 indicates that S260, saving of current HSS speed as base HSSS value, is to be performed.

In FIG. 4, at S300, the slow roll counter is compared with a maximum number of repetitions (MAX REP), which is a predetermined number. For example, the maximum number of repetitions may be 6.

If the comparison at S300 indicates that the slow roll counter is larger than the maximum number of repetitions (i.e., the YES branch from S300), an emergency shutdown procedure is performed at S305.

If the comparison at S300 indicates that the slow roll counter is smaller than the maximum number of repetitions (i.e., the NO branch from S300), at S310, a timer (e.g., 195 in FIG. 2) is set to a slow roll duration value (SRD), for example, 5 minutes.

At S320, an elapsed time (measured e.g., by the timer 195 in FIG. 2) is compared with the slow roll duration value, until the comparison at S320 indicates that the elapsed time becomes equal or larger than the slow roll duration value. In other words, a status in which the high speed shaft has the base HSS speed (which is between the first speed value and the second speed value) and the low speed shaft has a speed in the slow roll speed range (between LLL and HHH) is maintained for the slow roll duration.

At S330, a vibration amplitude (measured e.g., by the vibration sensor 180) is compared with a predetermined vibration limit (VL). The vibration limit may be, for example, 50 μm.

If the comparison at S330 indicates that the vibration amplitude is larger than the predetermined vibration limit (i.e., the YES branch from S330), the slow roll counter is increased at S340. Then, step S300 and respective steps following S300 are performed again.

If the comparison at S330 indicates that the vibration amplitude is smaller than the predetermined vibration limit (i.e., the NO branch from S330), step S350 (in FIG. 5), in which the speed of the high speed shaft increases, is performed. The increase of the speed (HSSS) of the high speed shaft determines increase of the speed (LSSS) of the low speed shaft and the centrifugal compressor towards a minimum operating speed.

While the speeds are increased, the vibration amplitude is compared with the predetermined vibration limit at S360. If the comparison at S360 indicates that the vibration amplitude has become larger than the vibration limit (i.e., the YES branch from S360), at S370, the speed (HSSS) of the high speed shaft is set to the base HSS speed (saved at S260), and step S340 (in FIG. 4) and the steps following S340 are performed.

If the comparison at S360 indicates that the vibration amplitude remains smaller than the vibration limit (i.e., the NO branch from S360), the current speed (LSSS) of the low speed shaft is compared with a minimum operating speed (MOS), at S380. The minimum operating speed may be about 70% of the maximum operating speed.

If the comparison at S380 indicates that the current speed (LSSS) of the low speed shaft has become larger than the minimum operating speed (i.e., the YES branch from S380), the hot restart of the compressor has been completed successfully (i.e., the bow has disappeared and the vibrations are within normal range, lower than the vibration limit).

If the comparison at S380 indicates that the current speed (LSSS) of the low speed shaft is smaller than the minimum operating speed (i.e., the NO branch from S380), steps S360 and S380 are performed again. The comparisons at S360 and S380 are continuously performed until the HSSS increase results in LSSS exceeding MOS. Increasing HSSS ends if the comparison at S360 triggers execution of S370 or if the comparison at S380 indicates that the LSS speed has exceeded the MOS.

Figure 6:
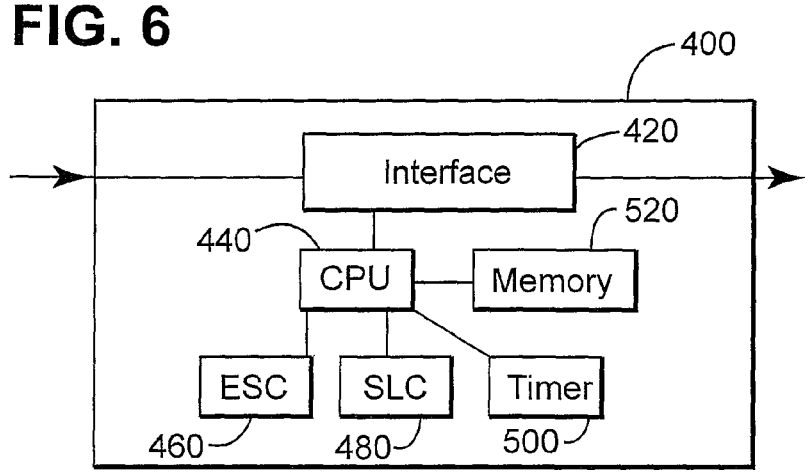
FIG. 6 is a schematic representation of a controller, according to an embodiment.

FIG. 6 is a schematic representation of a controller 400 configured to control a hot restart of a centrifugal compressor driven by a gas turbine which has a high speed shaft and a low speed shaft connected to the centrifugal compressor. The controller 400 may be in communication with the gas turbine (e.g., 110 in FIG. 2) and the centrifugal compressor (e.g., 120 in FIG. 2). All the components of the controller 400 described below may be implemented as software, circuitry or a combination thereof.

The controller 400 includes an interface 420, which may be configured to receive information about a current speed of the low speed shaft and a vibration amplitude of vibrations of the centrifugal compressor, and to transmit commands related to setting a speed of the high speed shaft.

The controller 400 includes a processing unit 440 which is connected to the interface 420, and may be configured to generate the commands based on the information. The commands generated by the processing unit 440 may include a first sequence of commands, to maintain a base slow roll speed of the high speed shaft for a predetermined time. When the high speed shaft has the base slow speed, a speed of the low speed shaft is in a slow roll range.

The commands generated by the processing unit 440 may also include a second sequence of commands to increase a set speed of the high speed shaft until the speed of the low speed shaft exceeds a minimum operating speed.

The processing unit 440 may repeatedly send the first sequence of commands to the interface 420, if, according to the information, the vibration amplitude is larger than a vibration limit (i) after performing the first sequence of commands, or (ii) while performing the second sequence of commands.

The commands generated by the processing unit 440 may further include a sequence of commands to determine the base slow roll speed of the high speed shaft.

The controller 400 may further include an emergency shutdown unit (ESU) 460 connected to the processing unit 440, to initiate an emergency shutdown procedure when the processing unit 440 indicates that the value of the base slow roll speed is not within a predetermined speed range.

The controller 400 may also include a slow roll counter (SLC) 480 connected to the processing unit and configured to count a number of times the processing unit sends the first sequence of commands. If the number of times exceeds a predetermined number of repetitions, the processing unit may initiate a shutdown procedure.

The controller 400 may further include a timer 500, connected to the processing unit and configured to indicate when the predetermined time has elapsed.

The controller 400 may also include a memory 520 connected to the processing unit and configured to store one or more of the slow roll parameters. The slow roll parameters include the slow roll speed, the slow roll range, the predetermined time, the minimum operating speed, the predetermined number of repetitions and the vibration limit.

The interface 420 may be further configured to receive inputs related to values one or more of the slow roll parameters.

Figure 7:
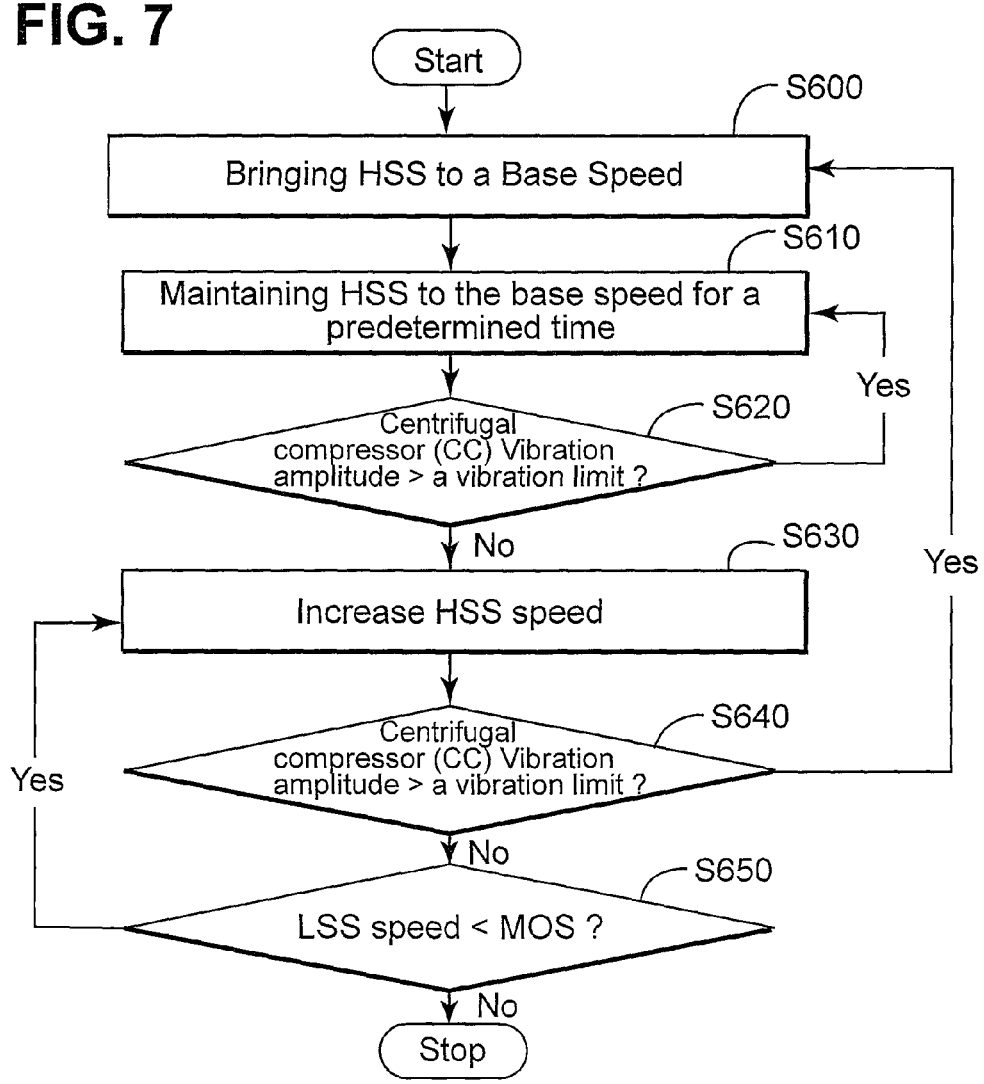
FIG. 7 is a flow diagram of a method for controlling a hot restart of a centrifugal compressor, according to an embodiment.

According to another embodiment, FIG. 7 illustrates a diagram of a method for controlling a hot restart of a centrifugal compressor (e.g., 120 in FIG. 2) driven by a gas turbine (e.g., 110 in FIG. 2) having a high speed shaft (e.g., 130 in FIG. 2) and a low speed shaft (e.g., 140 in FIG. 2) connected to the centrifugal compressor.

At S600 the HSS speed is brought to a base speed. At S610 the method includes maintaining the base speed of the high speed shaft for a predetermined time.

At S620, the method includes determining whether a vibration amplitude characterizing vibrations of the centrifugal compressor (CC) is larger than a vibration limit. If the vibration amplitude is larger than the vibration limit (branch YES from S620), step S610 is performed again.

If the vibration amplitude is not larger than the vibration limit (branch NO from S620), at S630, the speed of the high speed shaft HSS is increased. If the vibration amplitude becomes larger than the vibration limit (branch YES from S640), step S610 and the steps following S610 are performed again.

If the vibration amplitude remains smaller than the vibration limit (branch NO from S640), at S650, a current speed of the low speed shaft is compared with a minimum operating speed (MOS).

If the comparison at S650 indicates that the low speed shaft has not exceeded the minimum operating speed (branch YES from S650), step S630 and steps following S630 are performed again.

According to an embodiment, the method may also include determining the base slow roll speed of the high speed shaft. The determining operation may include: (i) setting a speed of the high speed shaft at a first speed value; (ii) performing an emergency shutdown if the speed of the low speed shaft is larger than a high limit of the slow roll range when the speed of the high speed shaft has the first speed value; (iii) increasing the speed of the high speed shaft up to a second speed value, or until determining the slow roll speed; and (iv) performing an emergency shutdown if the speed of the low speed shaft is below a low limit of the slow roll range when the speed of the high speed shaft has the second speed value.

According to an embodiment, increasing of the speed of the high speed shaft at S630 may be performed at a predetermined rate.

According to another embodiment, the method may further include counting a number of times S610 is performed. In another embodiment, additional to the counting, the method may also include performing an emergency shutdown if the number of times exceeds a predetermined number of repetitions.

According to another embodiment, the method may also include determining the base speed of the high speed shaft.

According to another embodiment, the method may also include inputting one or more of the slow roll parameters, the slow roll parameters including the vibration limit, the slow roll speed range, the minimum operating speed, the predetermined number of times and the predetermined time.

Methods similar to the method described above may be used for hot restart of gas processing systems having multiple stages.

The disclosed exemplary embodiments provide a method and a device for controlling a hot restart of a centrifugal compressor. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A gas processing system, comprising: a compressor; a turbine having a high speed shaft and a low speed shaft, the low speed shaft being configured to drive the compressor; and a controller connected to the compressor and the turbine, and configured to control a speed of the high speed shaft, and to receive information about a current speed of the low speed shaft, and a vibration amplitude of the compressor, wherein whenever the controller determines that the vibration amplitude is lower than the predetermined vibration limit, the controller is configured to maintain for a predetermined time the speed of the high speed shaft at a value at which the current speed of the low speed shaft is in a slow roll speed range and then increase the speed of the high speed shaft until the current speed of the low speed shaft exceeds a minimum operating speed.

2. The gas processing system of claim 1, further comprising:
an operator interface connected to the controller and configured to allow an operator to set any one of slow roll parameters, the slow roll parameters including the slow roll speed range, the predetermined time and the vibration limit.

3. The gas processing system of claim 1, further comprising:
an emergency shutdown unit connected to the controller and configured to perform a shutdown procedure when the controller indicates that the value of the speed of the high speed shaft is not within a predetermined speed range.

4. The gas processing system of claim 1, further comprising:
a slow roll counter connected to the controller and configured to count a number of times the controller performs maintaining the speed of the high speed shaft at the value for the predetermined time,
wherein the controller repeats performing the maintaining of the speed of the high speed shaft at the value for the predetermined time, when the vibration amplitude exceeds the vibration limit.

5. The gas processing system of claim 1, further comprising at least one of:
a gearbox located between the turbine low speed shaft and the compressor;
a speed sensor configured to measure a current speed of the low speed shaft;
a vibration sensor configured to measure a vibration amplitude of vibrations of the compressor; and
a timer configured to measure a time while the controller maintains the speed of the high speed shaft at the value at which the slow roll speed of the low speed shaft is in the slow roll speed range,
wherein the at least one of the speed sensor, the vibration sensor and the timer are connected to the controller.

* * * * *